United States Patent [19]
Converse, III et al.

[11] 3,896,670
[45] *July 29, 1975

[54] VENTURI METER

[75] Inventors: Vernon G. Converse, III, Franklin; Robert W. Clayton, Plymouth; James T. Westervelt, Livonia, all of Mich.

[73] Assignee: Scans Associates, Inc., Livonia, Mich.

[ * ] Notice: The portion of the term of this patent subsequent to Mar. 24, 1989, has been disclaimed.

[22] Filed: Mar. 24, 1972

[21] Appl. No.: 237,898

Related U.S. Application Data

[63] Continuation of Ser. No. 33,185, April 30, 1970, abandoned.

[52] U.S. Cl. ................................. 73/213
[51] Int. Cl. ............................... G01f 1/00
[58] Field of Search ......................... 73/213

[56] References Cited
UNITED STATES PATENTS

| | | | |
|---|---|---|---|
| 3,196,680 | 7/1965 | Curran | 73/213 |
| 3,204,459 | 9/1965 | Lehrer | 73/213 |
| 3,524,344 | 8/1970 | Converse III, et al. | 73/118 |

Primary Examiner—Richard C. Queisser
Assistant Examiner—John P. Beauchamp
Attorney, Agent, or Firm—D. Edward Dolgorukov

[57] ABSTRACT

The application discloses an improved variable area venturi meter adapted to be operated "critically," with the aid of which mass gas media flow rates can be measured or set up precisely and accurately for the purposes of many processes and methods where such operations are the key step thereof, such as in measuring gas flow for gas delivery, producing accurately proportional mixtures of gases, laboratory and production testing of carburetors, and similar processes. The application discloses in particular detail the use and the advantages of such variable area critical venturi meters in testing carburetors wherein a single such meter may be substituted for as many as 15–16 fixed area venturi meters, and successfully perform its intended function with added economy and greatly improved precision. The application also discloses the details of construction of the variable area critical venturi meter and of the means to vary selectively the area of the throat thereof, as well as the manner of mounting the area-controlling member to have a stable construction.

5 Claims, 13 Drawing Figures

PATENTED JUL 29 1975 3,896,670

SHEET 1

INVENTORS
VERNON G. CONVERSE III.
ROBERT W. CLAYTON
JAMES T. WESTERVELT
BY Gregory S. Dolgorukov
ATTORNEY

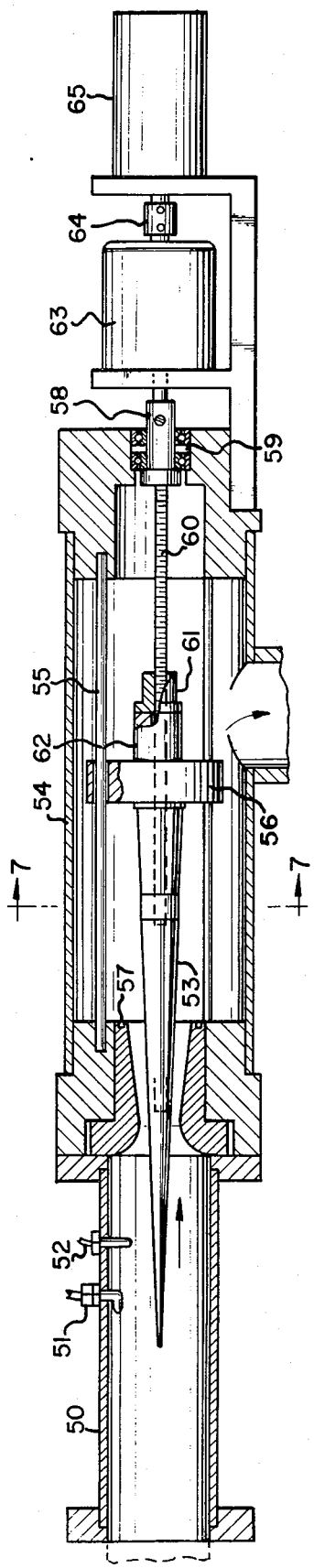
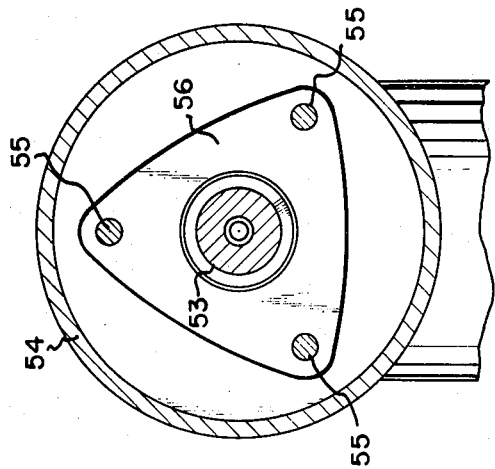
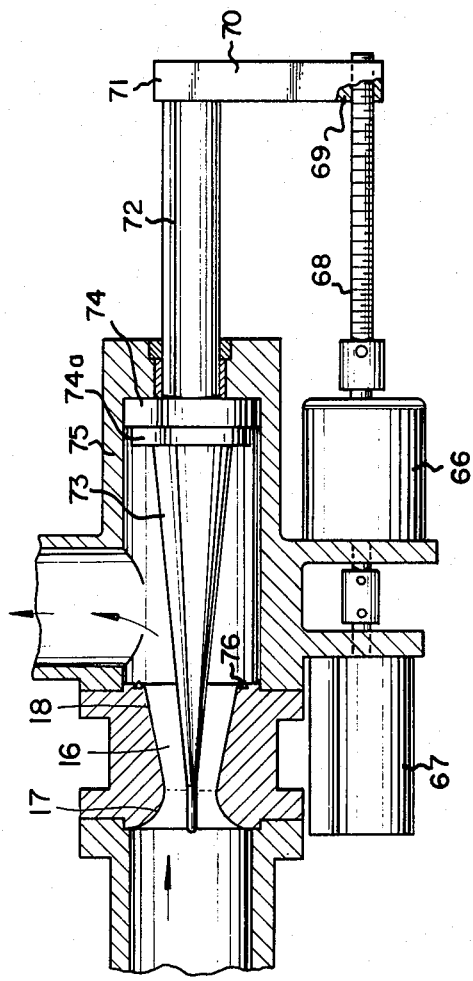
FIG. 6
FIG. 7
FIG. 8
INVENTORS
VERNON G. CONVERSE III.
ROBERT W. CLAYTON
JAMES T. WESTERVELT
BY
ATTORNEY

VENTURI METER

The present application is a continuation of Ser. No. 33,185, filed Apr. 30, 1970, now abandoned; a continuation-in-part of our co-pending application, Ser. No. 667,711, filed on Sept. 14, 1967 for Method and Apparatus for Testing Carburetors now U.S. Pat. No. 3,517,532; and a continuing application of our co-pending application Ser. No. 760,945, filed on Sept. 19, 1968 for Venturi Meter and Method and Apparatus for Testing Carburetors now U.S. Pat. No. 3,524,344.

The present invention relates to an improved venturi meter and to methods and apparatus for testing carburetors with the use of such meter.

Our said co-pending application discussed in detail the great public importance of testing carburetors, both in research and development work as well as in production, in order to prevent releasing for use in motor vehicle engines of the gasoline type of carburetors which produce fuel mixture not in accordance with the desired specification and causing improper combustion of the fuel, thus contributing greatly to pollution of the atmosphere. Heretofore, testing carburetors was primarily done by laboratory methods based on measuring the mass of air passed through a test carburetor as well as the quantity of fuel passed through the same carburetor during a definite limited period of time and determining by computations the air-to-fuel ratio produced by the carburetor. It should be understood at this point that while the flow of air through a carburetor is a controllable factor, the amount of fuel passing through the carburetor is an uncontrollable factor which is produced or induced by the air flow through the carburetor and which results and is affected by the construction and workmanship of the carburetor.

The laboratory methods of carburetor testing are exceedingly slow and are not suitable for production purposes. Accordingly, attempts have been made to provide systems intended to measure the rate of air flow and the rate of the fuel flow separately and thus to provide information for computing or receiving a signal giving the air-to-fuel mixture ratio as such. In measuring air flow, use of smooth approach nozzles has been attempted. By measuring the pressure upstream of the nozzle and downstream thereof and thus determining the "pressure drop across the nozzle," an indication of the rate of air flow could be obtained since the mass of air flowing through such nozzles for any given flow range has a relationship to the pressure drop across the nozzle. For such tests, use of the so-called "engineering flow box" has been resorted to. With such a system, one or more smooth approach nozzles were installed in a wall of an enclosed box and a test carburetor was installed in another part of such box. The pressure within the box was then measured at a non-turbulent or inert place thereof. In other words, the smooth approach nozzles in such systems were disposed on the upstream of the carburetor. While such systems did produce some of the desired results, they were exceedingly cumbersome, slow in operation, and made it most difficult to adjust the test carburetor housed within the box. Accordingly, the next development was directed to systems having nozzles in the form of venturi meters disposed on the downstream side of the carburetor.

By providing a powerful vacuum pump, the venturi meter was made to produce a definite maximum flow at any given upstream pressure and thus serve as a flow limiting device or a device producing in combination with a sufficiently powerful vacuum pump a definite air flow.

By calibrating a venturi nozzle, any desired air flow may be attained. In production, such calibration is, in effect, removing the material of the venturi nozzle body by polishing or some other operation until that venturi produces the desired air flow. It is obvious that with the area of the throat i.e. the narrowest part of the venturi passage, being fixed, such a venturi device can produce only one definite maximum flow for any given upstream pressure. However, since at various points of a carburetor operation range the air flow is different and since engines of various powers require carburetors of many different sizes producing different air flows, it is obvious that one venturi device can be used for producing the proper air flow for only one point of carburetor operation and in many cases of a single carburetor only.

On the other hand, it is necessary to test carburetors at several points of their operation ranges as well as to test carburetors varying in size. Accordingly, it became necessary to use in a single system more than one venturi nozzle and use them either separately or in various combinations to produce an approximation to a desired flow. The systems with a plurality of venturi meters so used are termed "binary" systems. As an example, with a test system having venturi meters calibrated to produce flows of ½ lb., 1 lb., 2 lbs., 4 lbs., and 8 lbs. per minute would be possible to achieve any air flow from ½ lb. per minute to 15-½ lbs. in increments of ½ lb. at any given upstream pressure. Because of the multiplicity of models and sizes of carburetors, in order to cover the ranges and test points desired by carburetor manufacturers, it has been necessary to have test systems with as many as 12 to 15 venturi meters per chamber or box. With the use of such number of venturi meters enabling producing as many as 8,000 combinations, still such system could not cover all desired points and the same were separated sufficiently far to prevent producing desired accuracy.

In addition, such multiplicity of venturi meters installed in a single chamber or box on the downstream of the carburetor requires an excessively large volume of such box. It can be appreciated that a large mass of the compressible fluids such as air would make adjustment of the carburetor and use of the smaller carburetors impracticable since the instruments detecting the changes of pressure in the chamber or pressure differences across the nozzles are insensitive to such instruments. Furthermore, with the venturi meters being disposed on the downstream of the carburetor, the air passing therethrough would contain fuel vapor and be, in fact, a mixture of gases with different properties than air and its mass would be also different.

Separating atomized fuel and fuel vapor from a large number of nozzles located in various places in the chamber becomes more and more difficult with increase of the number of the nozzles and the results obtained from such multiple nozzle systems are materially affected in their accuracy. It has been found that accuracy of such system can vary as much as from 1% to 8%. Even with the pure air, location of large number of nozzles results in individual nozzles being disposed in portions of the chamber with different air flow conditions resulting in actual air flows materially different from their calibration values. Moreover, the flow condition with the chamber affecting a singly operating venturi meter would be materially affected by putting in operation one or more additional venturi meters. Such added meters when put in operation would also be materially affected by the flow conditions within the chamber and thus affect results. Calibration of the venturi meters would have to be done not only with the chamber as a unit but also with the particular venturi meters used in any particular combination. Because of the number of possible combinations which may be used and for which such calibrations would have to be made in advance, such calibration would not be practicable. It is obvious that elimination of the above factors affecting accuracy of the venturi meters would greatly increase accuracy of such systems which, in turn, would have very important additional beneficial results. One of the objects of the present invention is to provide an improved method and apparatus for testing carburetors whereby the above difficulties and disadvantages are overcome and largely eliminated and a much simpler and more accurate carburetor testing system is thus produced without increase in costs and, in fact, with substantial reduction thereof.

Another object of the present invention is to provide an improved nozzle meter having a controlling opening and adapted to be operated critically at all of the points of its operation range and including movable means adapted to vary selectively the area of the controlling opening of the nozzle and thus to regulate the gas flow rate through the nozzle, and to provide such meter with indicating means calibrated to relate positions of said movable means to the resulting mass fluid flow rate when steady maximum flow at an opening is established.

A still another object of the invention is to provide a variable area critical flow venturi meter including means adapted to measure with greater precision that was attainable heretofore the mass gas media flow rate through said venturi at an infinitely large number of points of operation range of the venturi, and to produce accurately any desired mass gas media flow when its control means are set to produce the same.

A still another object of the present invention is to produce an improved carburetor testing system in which a carburetor can be tested at infinitely large number of points of its operational range with the use of a single venturi meter only.

A further object of the present invention is to provide an improved carburetor testing system, calibration of which for an infinitely large number of carburetor operation points may be done in a simple and easy manner.

A still further object of the invention is to provide an improved carburetor testing system, the accuracy of which is greatly improved and the test results of which are more reliable and consistent.

A still further object of the invention is to provide a system for testing carburetors, the meter and the chamber whereof may be calibrated as a unit in a relatively small number of points, with plotting of the test points and thereupon interpolating the intermediate points enabling to produce a reliable smooth curve.

A still further object of the present invention is to provide an improved venturi meter having variably controllable area, thus providing a single venturi meter producing desired gas or air flow rates.

A still further object of the invention is to provide a variable area venturi meter adapted to be operated critically and including a single area-controlling member having improved means for operating such member for controlling the area by changing the axial position of the controlling member with respect to the venturi throat, and in which each axial position of the control member is definitely related to a definite area of the venturi throat and therefore to a definite air mass flow rate and, inversely, every air mass flow rate is related to a definite position of the control member.

A still further object of the present invention is to provide an improved system for testing carburetors providing for more easy removal or separation of the fuel from the air mixture passing through the venturi meter, and which uses a much simplified instrumentation not only without loss of accuracy but with great increase thereof, and makes it possible to utilize computers with their information storing capabilities.

Further objects and advantages of this invention will be apparent from the following description and appended claims, reference being had to the accompanying drawings forming a part of this specification, wherein like reference characters designate corresponding parts in the several views.

FIG. 6 is a sectional view showing a variable area venturi meter device including a control member which is operated with the aid of a stepping motor and includes an encoding device which transforms rotation of the motor shaft into a remotely-located digital display related to the air mass flow rate when the venturi meter is operated "critically."

FIG. 7 is a sectional view taken in the direction of the arrows on the section plane passing through the line 7—7 of the FIG. 6

FIG. 8 is a view similar in part to FIG. 6 but showing a more compact form of the variable area venturi meter device.

Figure 1:
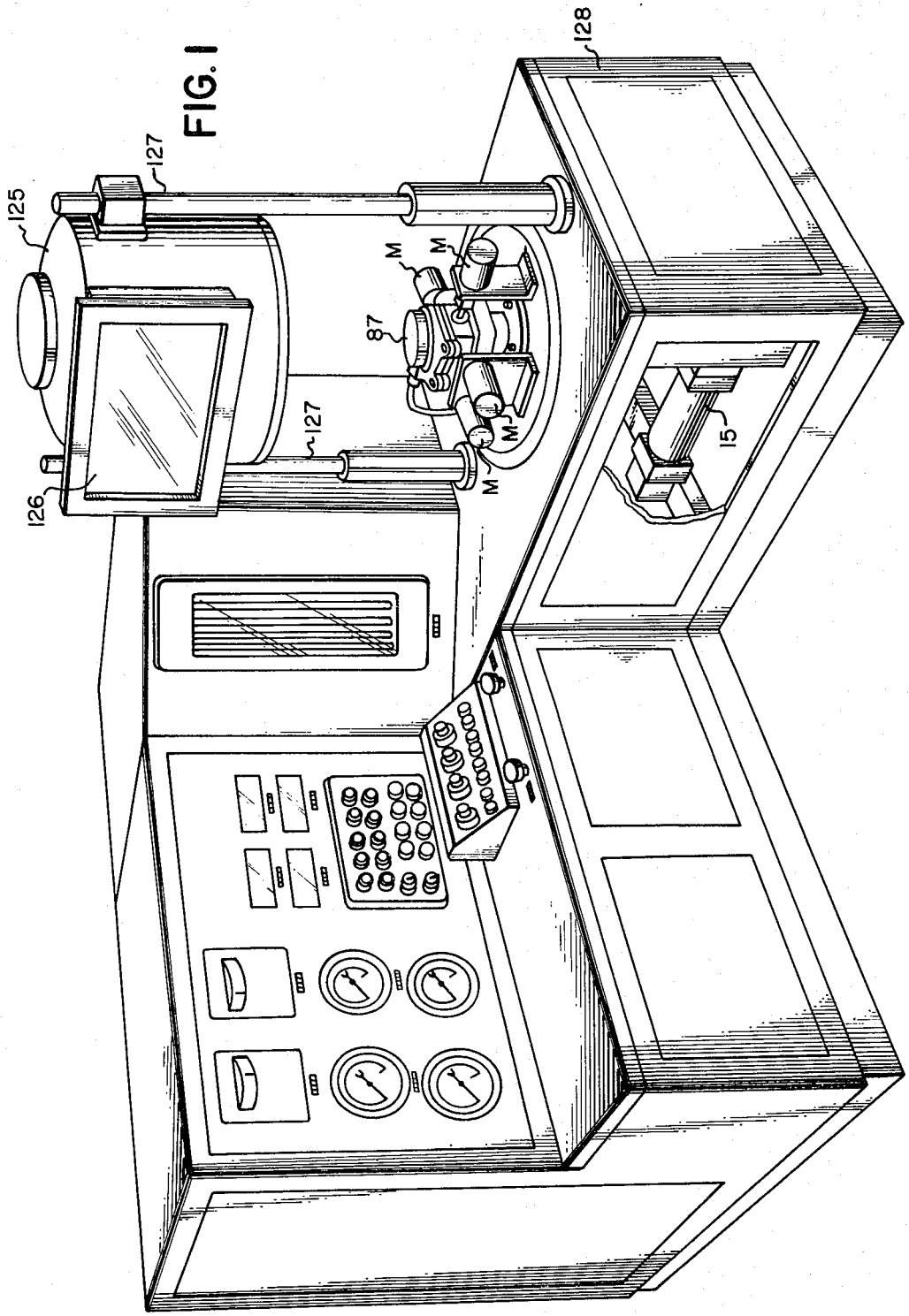
FIG. 1 is a perspective view showing one complete system for testing carburetors, embodying the present invention, with its windowed hood or test carburetor cover being shown raised.

It is to be understood that the invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for the purpose of description and not of limitation.

It should be understood that a venturi meter may be operated as determined by the upstream and downstream pressures, at any desired flow within limitation of its size. Therefore, the terms "critical flow venturi meter" or "variable area critical venturi meter" as used herein should be understood to mean venturi meters or variable area venturi meter operated to produce "critical" flow of gaseous medium therethrough. The critical venturi meter itself is a restriction device designed so that a certain difference between the upstream and the downstream pressures expressed in absolute terms will make the device to go "critical." The upstream pressure in a venturi meter divided by the downstream pressure therein, with both expressed in terms of absolute pressure, is known as the "pressure ratio." In our practice, when this ratio reaches 1.3, the venturi device is presumed to operate "critically." As long as this critical pressure ratio is met or exceeded, nothing which happens on the downstream side of the venturi meter would affect the mass flow rate of the gas flowing through the meter. However, it should also be understood that the mass flow rate of any gas is dependent on the density of the gas immediately upstream of the venturi meter. Therefore, if the upstream pressure is increased, the mass flow rate through the venturi meter will also be increased in direct proportion to the increase in the density of the incoming gas caused by the pressure increase. Temperature affects the density of the incoming gas inversely and thus also affects conditions of "critical" operation.

While the variable area venturi meter adapted to operate critically, i.e. to produce a maximum flow for the area used at any given upstream pressure, and provided with means to measure such mass flow rate precisely, or to be set or adjusted to produce the desired mass air flow rate accurately, is illustrated and described herein in great detail in application to a system for testing carburetors, both for laboratory as well as production testing purposes, the present invention is not limited to such applications. Our improved variable area critically operated venturi meters can be used with success in many other applications. Their use may be particularly successful and valuable in applications where it is necessary to limit desired gas mass flow rate to a predetermined value with much more precise and flexible control than has been possible heretofore. Moreover, their use is not limited to air since they can be successfully used for various gases and mixtures of gases. Our variable area venturi meters may be used for measuring such gases, for producing gaseous mixtures, for calibration of metering devices for gas delivery, for carburetor testing systems, as mentioned, and in general for operations and processes where measuring of gas flow or gas mass flow rates or producing predetermined gas flow or gas flow rates is the key step or operation. The precision of our venturi meters is greatly superior to conventional gas meters, and is their one of the most important features.

It will be understood that attaining such results is done in a large measure by the provision of accurate measuring means for the variable area venturi device, which means are based in a large degree on accurate measuring of the position of the control member of the venturi, and relating by accurate calibration of such position to the effective area of the venturi and the maximum air mass flow rate at such position. While it is possible to calibrate the venturi for any desired pressure difference, it is preferable to do so for critical condition of venturi operation, and to use the venturi device also under critical conditions.

Figure 3:
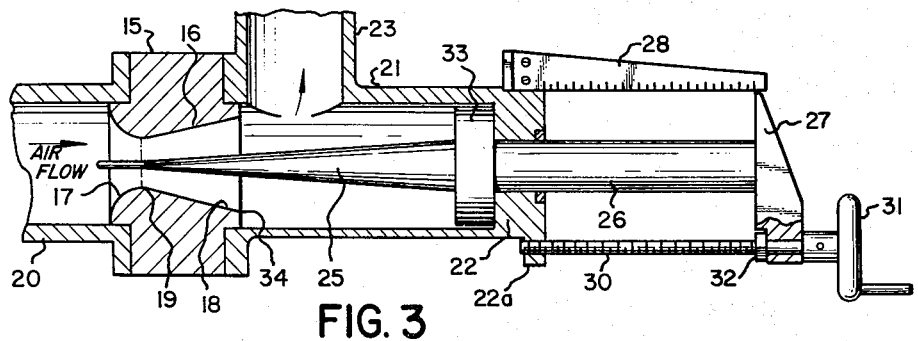
FIG. 3 is a sectional view showing a variable area venturi meter device including indicating means in the form of a linear scale and a pointer for identifying positions of its control member for the purpose of relating such positions to corresponding areas of the venturi throat and, therefore, to mass air flow rates when the venturi is operated to produce critical flow through such areas.

FIG. 3 illustrates the construction of a simple form of the variable area venturi meter. As illustrated in said FIG. 3, such device comprises the venturi body 15 provided with a venturi tube or passage 16 comprising a smooth converging approach tube or section 17 and a smooth diverging tube or section 18. The narrowest area between said two sections constitute the throat 19 of venturi. The body 15 is connected to the pipes 20 and 21 co-axially therewith. The pipe 21 has its end 22 closed and is provided with the exhaust escape pipe 23. A control member in the form of a control cone 25 is provided with an extension 26 passing through the closed end 22 of the tube 21 and carries a pointed indicator or pointer 27 secured to said extension 26 and co-operating with a scale 28 graduated in any desired units. In the lower end of the pointer 27 there is journaled for rotation a smooth end of an externally threaded rod 30, the other end of which cooperates with an internally threaded downward extension 22a of the end 22. The smooth end of the bar 30 rotates freely in the pointer body and is rotated with the aid of a hand wheel 31.

It will now be seen in view of the foregoing that rotation of the hand wheel 31 causes the rod 30 to move to the left in the extension 22a, carrying with it the pointer 27 held between the wheel 31 and the fixed nut 32, as well as the extension 26 together with the control cone 25. Secured to the wider end of the control cone 25, or integrally formed thereon, there is a piston-like flange 33 slidably fitted within the pipe 21 and maintaining the control cone 25 on the axis of the venturi passage 16. The piston-like flange 33 also determines the extreme positions of the control cone 25. In the position illustrated in FIG. 3 the working area of the venturi throat is at its maximum and so would be the mass flow rate of the gaseous medium flowing through the venturi at any given upstream pressure.

It is of importance that any position of the control cone 25 is positively related to a definite position of the pointer on the graduated scale 28, and to a definite critical gas mass flow rate. Such relationship is established by calibrating the venturi in such position and thus relative such position to the measured mass flow rate of the gaseous medium. If the pressure difference across the venturi is sufficiently high, such critical flow would have a definite value. In many applications it is preferable to create such difference by applying vacuum to the tube 23. The vacuum pump or other vacuum creating means should be sufficiently powerful to produce such critical flow through the venturi.

Figure 12:
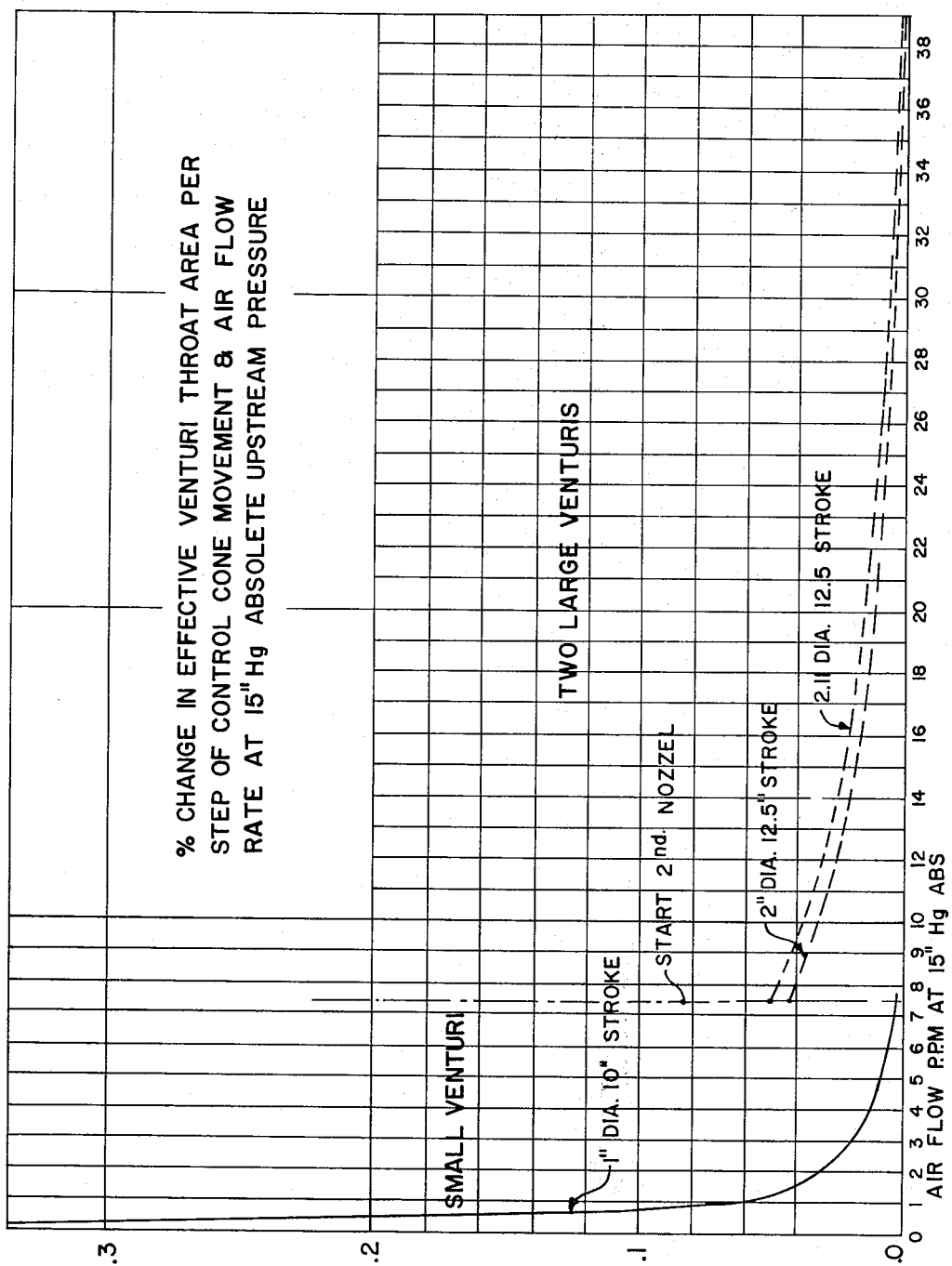
FIG. 12 is a curve diagram illustrating the relationship between the positions of the control member of the venturi and the resulting areas, and, therefor, the air mass flow rate.

The critical gas or air mass flow rate for positions of the control cone 25 as registering on the scale 28 should be calibrated for as many graduations or points on the scale 28 as practicable, and such positions and the corresponding gas or air mass flow rates should be recorded in any suitable way such as on a numerical chart or by means of a curve such as shown in FIG. 12.

By examination of FIG. 3, it can be seen that the longitudinal or axial travel of the control cone 25 is represented by the distance from the lefthand face of the flange 33 to the righthand face of the venturi body 15, which distance is equal to the distance from the lefthand face of the pointer 27 to the righthand pointer of the closed end 22 of the tube 21. Obviously, the threaded portion of the rod 30 should be sufficiently long to provide for such movement. In the fully extended position of the control cone 25 the same extends into pipe 20 and, depending on the included angle of the cone 25, it may completely close the throat of the passage 16 or the flange 33 may contact the flat surface 34. In either case there would be virtually no flow through the venturi meter.

It will also be understood that while the graduations on the scale 28 identify positions of the control cone and imply movement in steps, actually there would be an infinitely large number of points in the above-described range of the control cone movements, with corresponding infinitely large number of gas or air mass flow rates. Thus, if the relationship explained above is plotted as a number of points, interpolating intermediate points would provide a smooth curve from which values corresponding to any position of the control cone can be read with sufficient accuracy.

As far as the angles of the venturi and of the control cone are concerned, the approach tube or section 17 of the venturi is relatively short and is well rounded. The diverging tube or section 18 is considerably longer and the angle of divergence of this section is relatively small and represents a rather sensitive factor. Gases of various densities may require different angles of divergence in the diverging tube of the venturi in order to produce a smooth flow. For air or mixture of air and gasoline vapor in the amounts used in engine inflamable mixtures we have used with success the included angle of the diverging section tube equal to 12°, and included angle of the control cone slightly under 3°. In cases of other gaseous fluids, these angles may be developed experimentally either from the very beginning or after the first approximation has been computed. Regardless of which angles are finally arrived at for the angle of the control cone and that of the diverging section of the venturi, due to the straight line generatrix of the control cone, it is an important feature of the present invention that the exit angle of the variable area venturi meter will remain constant no matter which position the control cone is in. This is necessary because if you did not maintain the same exit angle as the control cone moved in and out of the venturi passage, you would have a non-linear change of the effective throat area of the venturi, and each position of the control cone would not have a direct relationship to the throat area of the venturi meter.

We have found that with properly designed venturi passage and a control cone of a suitable angle, the control cone also has a steadying effect on the fluid stream within the diverging section of the venturi and eliminates turbulences which otherwise may tend to develop therein.

It should also be understood that included angles of control cone much larger than 3° greatly reduce precision of measurements and are not desirable for such reason. Proper selection of the included angle for the control cone requires careful balancing of the requirements of compactness and avoidance of excessively long control cone on one side, and attaining the desired accuracy of measurements, which accuracy is affected by decreasing the length of the control cone.

Figure 4:
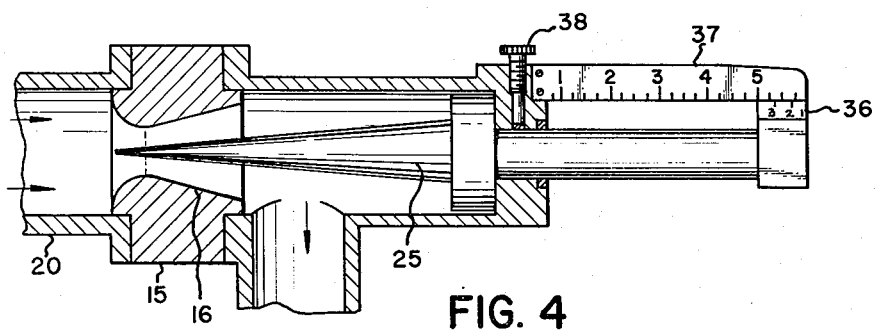
FIG. 4 is a view similar in part to FIG. 3 but showing a variable area venturi meter device in which the pointer of its indicating means is in the form of a vernier.

FIG. 4 shows a variable area venturi meter substantially similar to that of FIG. 3, with the difference being in the fact that the venturi cone thereof is manually moveable and the pointer thereof is in the form of a vernier, such as indicated at 36, cooperating with a suitably graduated scale 37. A locking screw, such as shown at 38, is provided for locking the venturi control cone in its set position.

Figure 5:
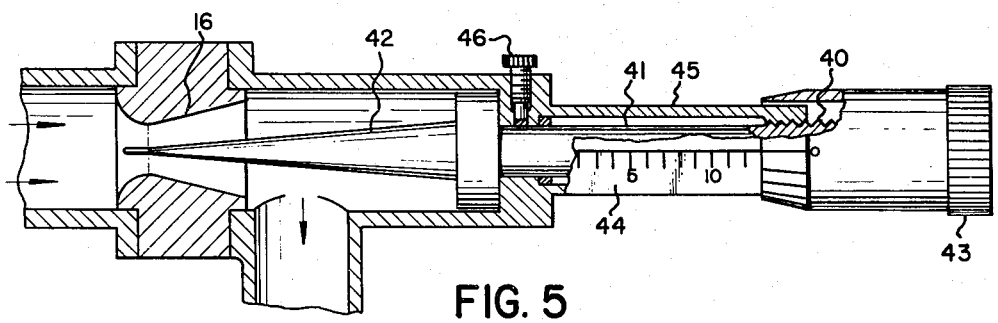
FIG. 5 is a view similar in part to FIG. 3 but showing a variable area venturi meter device in which the pointer of its indicating means is in the form of a micrometer screw-and-drum mechanism.

FIG. 5 illustrates a construction in which the control cone is operated manually with the aid of a micrometer screw 40 provided on the end of the extension 41 of the control cone 42, and has a micrometer drum 43 cooperating with micrometer scale 44 engraved on the tubular casing 45 within which the extension 41 operates. Locking screw 46 is provided for locking the control cone 42 in its set position. Such a construction provides for very fine adjustments of the position of the control cone 42 as well as its precise identification.

FIG. 6 illustrates a construction of a variable area venturi meter device adapted to be operated at a critical flow for each area, in which device the movements of the control cone are produced by means of an electric motor and the measuring signal identifying positions of the control motor shaft, and therefore of the control cone, is done automatically. In the construction illustrated in FIGS. 6 and 7, the flow steadying tube 50 has provided therein an absolute pressure probe 51 and a temperature probe 52. The control cone 53, which in FIG. 6 is shown in one of its intermediate positions, moves axially of the venturi passage. Its flange 56 moves within the escape tube 54 on guide bars 55, and does not contact the walls of the tube. The guide bars 55 prevent rotation of the control cone assembly and guide the control cone assembly in its axial movements. In the fully extended position of the control cone 53, the lefthand face of the flange 56 contacts the circular seal member 57 of the venturi, thus stopping flow of the air therethrough.

A bushing 58 is journaled in a double row ball sealing bearing 59 and is secured to the end of the threaded bar 60 cooperating with a nonrotating nut 61 secured to the rearward extension 62 of the control cone 53. The bushing 58 is secured for rotation to the armature shaft of the stepping motor 63. The opposite end of the armature shaft of the stepping motor is connected with the aid of coupling 64 to an encoder device 65. The stepping motor 63 is a d-c motor and its armature shaft takes a definite number, such as 200 of precise steps per one revolution. Thus, each step amounts to rotation for 1.8°. Stepping motors and encoders of this nature are well suited for use in computers, pneumatically controlled machines, automatic or assembly devices, test and inspection apparatus, and similar operations. Accordingly, the number of steps taken by the motor can be precisely controlled and its armature stops after taking the prescribed number of steps and continues to remain stationary until the next command is given. The number of steps taken by the motor and, therefore, the rotation of the screw bar 60 actuating the control cone 53 is accurately shown by the encoder device which gives a suitable digital indication identifying the position of the control cone or representing the corresponding value of the gas or air mass flow rate taking place through the area determined by the control cone in the given position thereof.

FIG. 8 illustrates a modification of the construction of the FIGS. 6 and 7 providing a more compact form of the device. Similarly to the construction of FIGS. 6 and 7 the construction of FIG. 8 also utilizes a stepping motor 66 and encoder device 67 but the same are arranged on an axis parallel to the axis of the venturi and spaced therefrom rather than on continuation of said axis as in the construction of FIGS. 6 and 7. The armature shaft of the stepping motor 66 is secured to the threaded or screw bar 68 cooperating with the internally threaded end 69 of the piece 70 having its opposite end 71 secured to the rearward extension 72 of the control cone 73. The piston-like flange 74 slides within the escape tube 75, and its reduced portion 74a is adapted to contact at the end of its extending stroke the seal 76 for stopping the flow of fluid through the venturi. The stepping motor shaft rotates the screw bar 68 causing longitudinal movement of the piece 70, thus actuating the control cone 73 axially for controlling the throat of the venturi. Operation of the device illustrated in FIG. 8 is substantially similar to that of the construction of FIG. 7 except for the above-explained mechanical differences of connection between the control cone and the stepping motor shaft.

Figure 9:
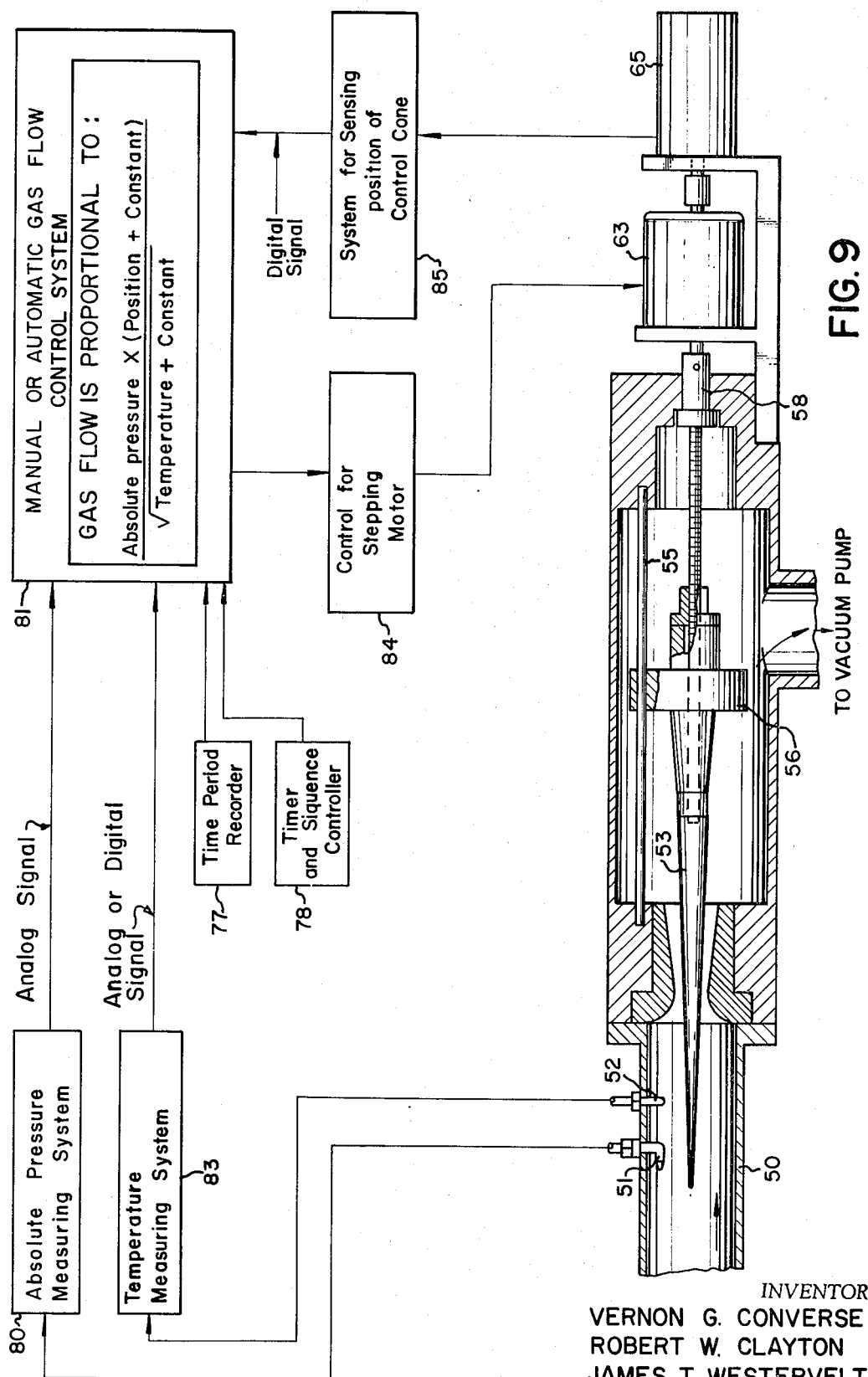
FIG. 9 is a diagrammatic view of a mass air flow control system including a variable area venturi meter adapted to be operated "critically."

FIG. 9 illustrates a variable area critical venturi meter device substantially similar to that illustrated in FIG. 8 and provided with control devices for producing and controlling either manually or automatically a desired gas flow. Arranged as illustrated in FIG. 9, the system represents a self-contained installation which may be used for measuring, setting up and controlling gas flow for various applications such as delivery of gases, producing accurately proportioned mixtures of two or more gases, calibration of metering devices for gases, and for various production and inspection processes in which measuring or setting up gas flow rates is an important or critical step.

As illustrated in FIG. 9, the absolute pressure probe 51 installed in the intake pipe 50 is operatively connected with the absolute pressure measuring system 80 producing a corresponding analog signal and transferring the same to any desired manual or automatic gas control system such as indicated at 81. The temperature probe 52 is connected to the temperature measuring system 83 producing a suitable analog or digital signal and transferring the same to the control system 81 for providing a suitable correction based on the temperature of the incoming gaseous medium. The control system 81 which includes proper indicating means for manual or automatic control of the stepping motor 63 and automatic transmission of the suitable signal to the control system 84 sets the position of the control cone 53 and operates the encoder 65 to produce a signal and convey the same to the system 85 for sensing position of the control cone and transferring the digital signal to the control system 81.

Provision of the cover-like member contacting the righthand surface of the venturi body to close the venturi passage and interrupting the flow of fluid therethrough as described, has the following important advantage.

Heretofore interrupting the gas flow through the venturi meter was accomplished by making the member performing the function of the control cone made thicker than the venturi meter passage in order that when the control cone comes to the end of its closing movement it contacts the inner walls of the venturi passage and closes the opening within such venturi passage. Such a construction has a serious disadvantage in gradually disorganizing the operation of the venturi and particularly by making its measuring function unreliable. To close the venturi passage opening, the member performing the function of control cone has to be pressed rather hard into the venturi passage to form a seal with the walls thereof. With each time the venturi passage is so closed, the cone enters deeper and deeper into the passage enlarging its diameter. With many thousands of such closings and openings, the built-in relationship between the closing position of the cone and the scale indicating such position is disorganized, and pretty soon cannot be any more depended upon to give precise measurement. It should be understood that venturi meters of the character to which the present invention relates are calibrated very precisely by very careful polishing and such precision is very easily destroyed by the operation described above.

It should be also understood that such undesired operation of the venturi meter is particularly pronounced when the control cone is thin and long since it has much greater mechanical advantage when being pressed into the venturi passage, and such undesirable action thereof is greatly increased. Therefore, making control cone of such a small angle as in the present construction in order to produce more precise measurements, would operate to destroy the precision of such measurements.

As is clearly shown in FIGS. 3, 4, 5, 6, 7, 8, 9, 10, 11 and 13, such undesired operation of the venturi meter is prevented by having the interruption of the gas flow through venturi meter caused by the provision on the thick end of the control cone of a cover-like flange adapted to close the end of the divergent portion of the venturi passage and thus to stop the flow of the fluid through the venturi. Thus, the precision measuring function of the venturi passage is attained without the above adverse effect.

It will be understood that the above-described system can measure or produce gas mass flow rates of desired values. However, combined with a suitable time period recorder device 77 to measure the period of time during which a constant rate of flow of metered gas was taking place, it can give the values for mass or weight of the gas which passed through the venturi during that period. In addition, a suitable timer and sequence controller such as 78 could be utilized to start flow of gas of a definite and predetermined flow rate and at a definite and predetermined time of the day, to increase or to decrease such flow in a predetermined manner and at predetermined time, so as to close the gas passing conduits at a predetermined hour. Such systems may be used in numerous applications to a great advantage.

The above-described components including timers are well known in the trade, are available commercially, and need not be described in detail herein.

Although one of the most important advantages of the variable area critical venturi meter is its ability to be operated at indefinite number of points of its operating range and be quickly set for operation at any particular point in an exceedingly simple and fast manner without operating numerous valves for achieving the desired combination, such as in fixed area venturi tubes, we have found that use of two variable area venturi meters in combination gives important advantages in many applications such, for instance, as in carburetor testing systems.

In such an application two variable area venturi meters, one of them of relatively large size and the other usually of a smaller size are arranged in two parallel fluid circuits with the gaseous medium flowing through both venturi. Within the range of operation of the smaller venturi, the larger venturi may be closed and all adjustments are done on the smaller venturi. The smaller venturi is more precise in its adjustments and is better suited for adjustments for testing at "idling" and "off idling" points of carburetor operations. When the desired point of operation is beyond the capacity of the smaller venturi, the system is then operated with the larger venturi open.

Figure 10:
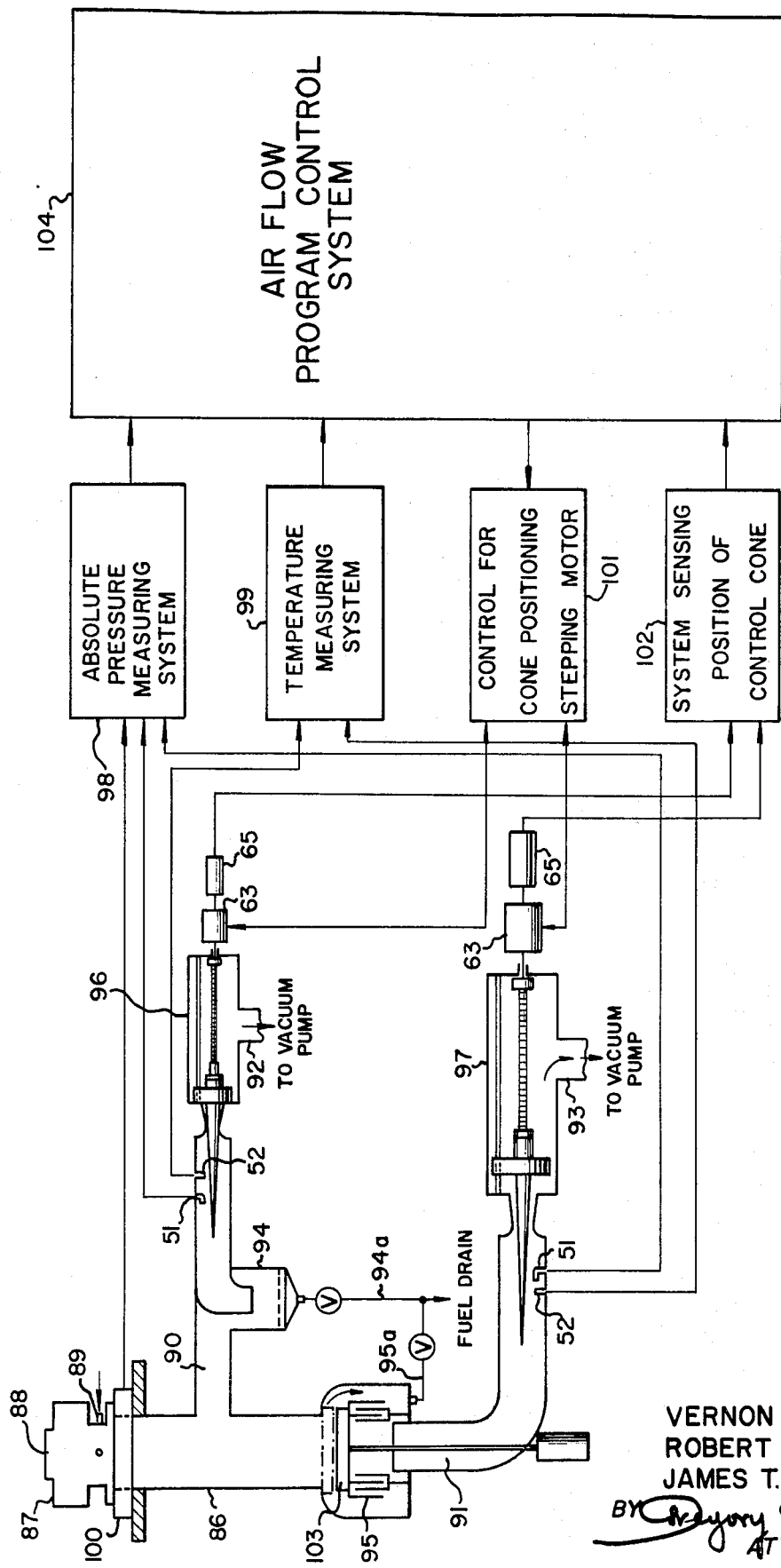
FIG. 10 is a partial diagrammatic view showing the arrangement of controls of the variable area venturi meters adapted to be operated critically controlled by computerized air flow program control system.

An arrangement of the above-described nature is illustrated in FIG. 10 which illustrates air flow control system intended for use in a carburetor testing installation. As illustrated in FIG. 10, the system comprises a chamber 86 adapted to receive at its top a test carburetor 87. The test carburetor receives air at its top opening 88, and fuel at 89 from a suitable fuel supply system (not shown). The chamber 86 is connected to two air conduits 90 and 91 both connected with the aid of conduits 92 and 93 with a source of vacuum, such as a vacuum pump (not shown). Within said conduits 90 and 91 are operatively interposed fuel removing devices 94 and 95 intended to remove as much fuel as possible from the air which passed the carburetor, and to drain the same through the drain pipes 94a and 95a, controlled by suitable valve, into a receptacle (not shown) for re-use, and for safety considerations.

Within the conduits 90 and 91 there are operatively interposed venturi meters 96 and 97. In the present embodiment such venturi meters are of the type as illustrated in FIGS. 6 and 7 and are each provided with similarly operating stepping motor 63 and encoder 65, respectively. A pressure probe 51 and a temperature probe 52 are provided within the incoming air tube of the venturi meter 96. The pressure probe 51 is connected to the absolute pressure measuring system 98 while the temperature probe 52 is connected with the temperature measuring system 99. The absolute pressure measuring system 98 is also connected to a pressure sensing ring 100 in order to measure the absolute pressure on the downstream of the carburetor throttle. Similar probes 51 and 52 are also inserted in the conduit 91 leading to the venturi meter 97 and are connected, respectively, to the absolute pressure measuring system 98 and the temperature measuring system 99, as shown. The stepping motors of the venturi meters 96 and 97 are controlled by the control device 101 to which both are connected, as shown. Similarly, the encoders 65 are connected to a system 102 for sensing and indicating the position of the control cones. A shut-off valve 103 is provided at the bottom of the chamber 86 in order to shut off flow of air from the conduit 91 and the larger venturi meter 97. Air flow program control system, of any suitable construction, such as designated by the numeral 104, is provided in order to program the sequence of as many test points of the carburetor operation range as desired.

The above system described in FIG. 10 does not illustrate a complete carburetor testing system but only the air flow control system which may be used in a carburetor testing installation. A complete system for testing carburetors is illustrated in FIG. 11.

Figure 11:
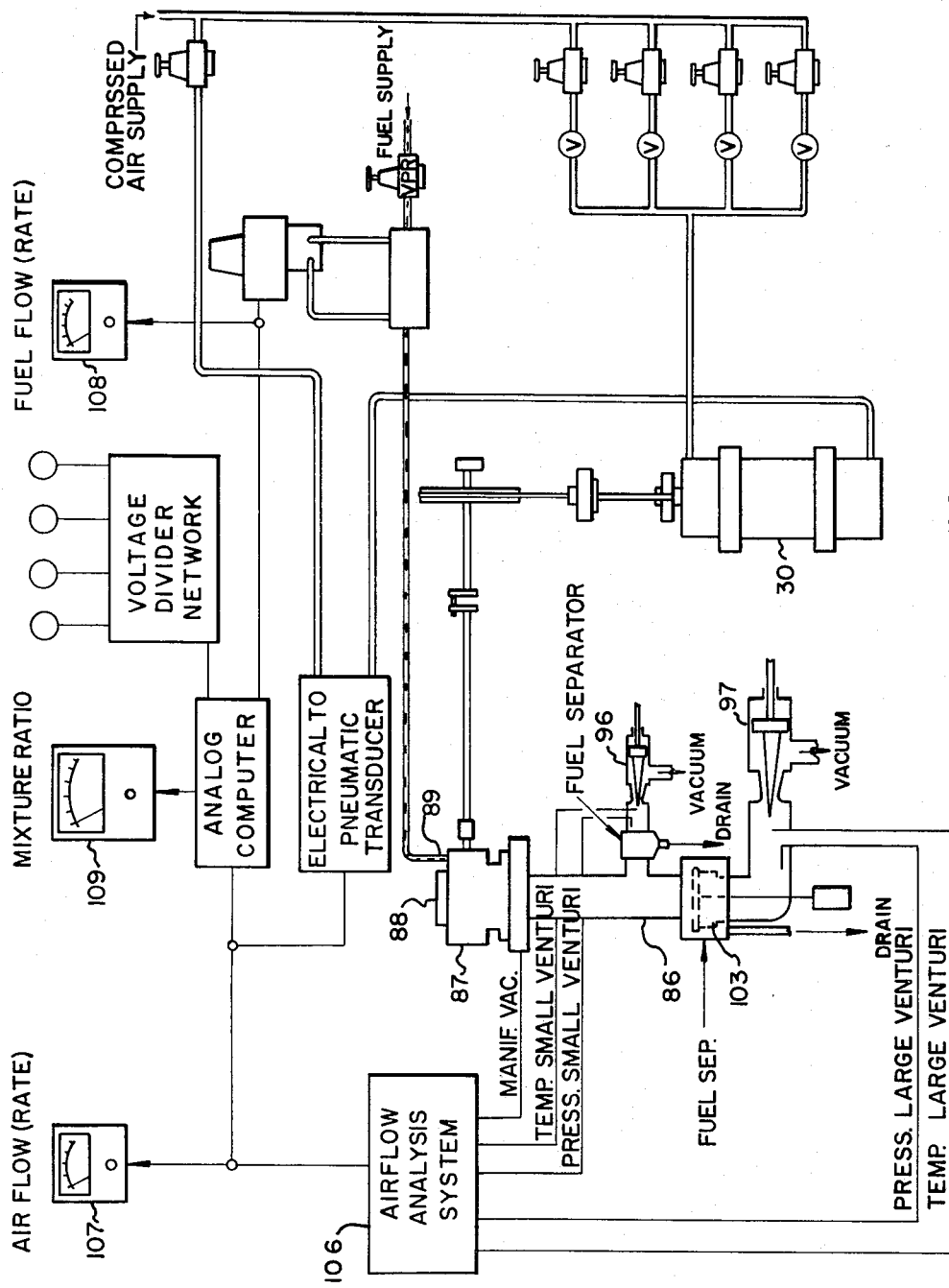
FIG. 11 is a diagrammatic view of a carburetor testing system determining the air-to-fuel ratio of a test carburetor, in which system the mass air flow rate is controlled by a pneumatically set carburetor throttle cooperating with two critically operated variable area venturi meters arranged in parallel.

The system of FIG. 11 is substantially similar to the system illustrated in FIG. 15 of our above-mentioned co-pending application Ser. No. 667,711 with the exception of using two variable area venturi meters instead of three fixed area venturi meters operated in various combinations as disclosed in said co-pending application. In view of the foregoing, it will now be seen that the system illustrated in FIG. 11 of the present application can be quickly set at any desired point of the operation range of the test carburetor since it can be adjusted to produce any desired air flow rate while the system of FIG. 15 of the co-pending application is limited to the points at which the air flow is such as can be produced by combinations of the three fixed area venturi meters.

As a matter of actual practice in production testing, the use of an indefinite number of test points is seldom required, and the system of FIG. 11 which may be thought of as a production inspection system may be actually used with only eight points or less. With such number of points, the use of a positioner of the pneumatic type with four variable pressure regulators may be entirely sufficient for setting the throttle in proper position for such points without introducing any appreciable error.

Similarly to the construction of FIG. 15 of our co-pending application, the construction of FIG. 11 of the present application includes a pneumatic throttle positioner 30 adapted to set the carburetor throttle in a position in which the pressure within the chamber 86, i.e. on the downstream side of the carburetor throttle, would correspond to the pressure in the intake manifold of an engine with its carburetor operating at the corresponding point of its operation range and having the same air flow. The air flow rate is measured by the air flow analysis system 106 consisting of several components operative to sense the absolute pressure and the temperature on the upstream side of the venturi, as well as immediately on the downstream side of the carburetor throttle, and to convert the pneumatic signal resulting therefrom by means of transducers into an electric signal indicated on the electrical indicating device 107 as related to the air flow rate. The system 106 does not form by itself a part of this invention, is available commercially, and therefore it need not be described in detail herein.

The fuel flow induced through the carburetor by the air flow is indicated on the device 108 in the same manner as in the system of FIG. 15 of said co-pending application. The same is true with respect to the indication of the resulting mixture ratio on the device 109. Therefore, detailed description of such operation is deemed not to be necessary herein.

FIG. 12 illustrates the fact that movement of the control cone through equal increments within its range of movements does not produce equal changes in the effective area of the throat of the venturi, since the change in such area is larger as the control cone approaches its fully closed position and decreases as it moves away therefrom. It will be understood in view of the above that the line representing such relationship and plotted in a system of coordinates representing percent of area increase vs. air flow will be not a straight line but a curve. This is important in producing and using graphical representation of the above relationship, particularly for the purposes of projecting the values in question.

Referring to FIG. 12, it should be noted that the curve plotted within the range of air flow from 0 to 7.5 pounds per minute is for the small venturi.

The two curves plotted within the range of air flow from 7.5 pounds per minute to 39 pounds per minute is for two venturi, the upper curve is for the venturi of 2.11 inches diameter throat and 12.5 inches stroke of control cone; the lower curve is for the venturi with 2 inches diameter throat and 12.5 inches stroke of the control cone.

Figure 13:
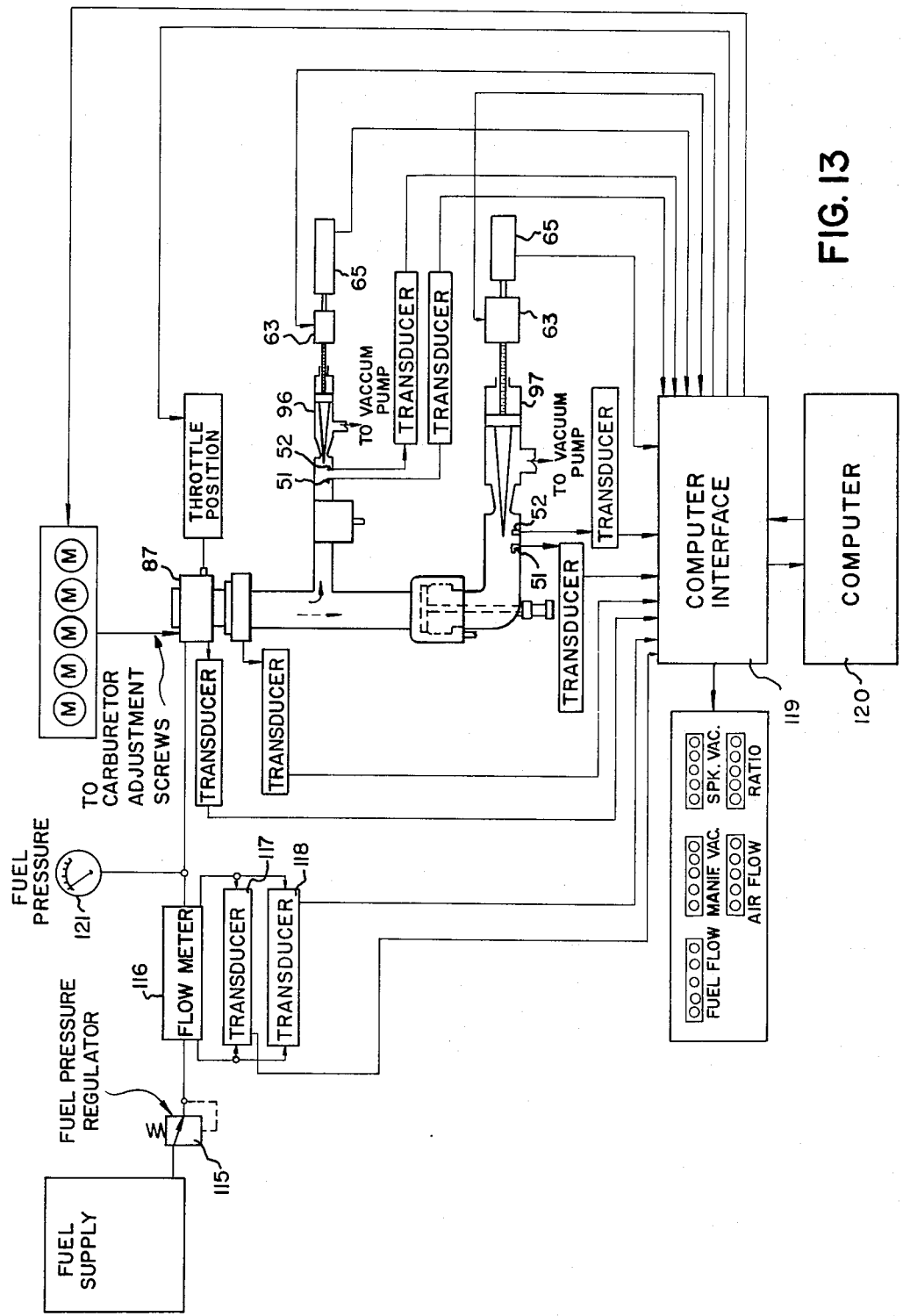
FIG. 13 is a diagrammatic view of a carburetor testing system with a provision for checking calibration of the variable area critically operated venturi meters.

Referring to FIG. 13, this figure shows how the variable area critical venturi meter or meters may be used in combination with other instrumentation to measure and indicate air flow rates in a carburetor testing system to produce actual values thereof rather than percent deviation from the operation of a sample carburetor as in our said co-pending application. Thus, this system represents, in effect, a laboratory test system, rather than a production inspection system.

The illustrated system comprises, generally, three sub-systems: the fuel supply system, the carburetor system, and the air flow system. Referring to the fuel system, it comprises a fuel supply means delivering fuel through a fuel pressure regulator 115 and thereafter through a linear mass flow meter device 116. Connected across the flow meter device 116 are two transducers 117 and 118 feeding information on fuel flow rate to the computer interface 19 and from there to the computer 120.

Since the term "computer interface" will be used in several places, it is to be understood that a computer interface merely changes the signals received in some form from the transducer or other device into signals which can be fed into the computer. Also, it performs the reverse function in that signals coming from the computer go through the computer interface and are changed from computer language into signals which can operate other devices, such as electric motors.

After the fuel passes through the flow meter 116, its pressure is measured by a fuel pressure indicator 121 whereupon it passes into the test carburetor 87. Such operation of the fuel supply system is induced by the air flow system operating to produce and to measure any desired air flow through the test carburetor. This is done by way of two variable venturi meters 96 and 97 working singly or in combination depending on the air flow desired.

The operation of the variable area venturi meters with their temperature and pressure probes 51 and 52, their stepping motors 63 and encoders 65 remains substantially the same as explained above with respect to FIGS. 10 and 11. For this system it is only necessary to mention that the signals from the temperature and pressure probe, as well as the encoder signal, are fed into the computer interface 119 and from there into the computer 120. From all of these signals, as well as from what has been programed into the computer, it is possible for the computer to give a proper output signal to the stepping motors 63. As a result, positions of the control cones of the variable area venturi meters as well as the carburetor adjustments, including its throttle position will be set at any programed testing point. Furthermore, the computer 120, if so programed, can supply information and indications as to fuel flow, manifold vacuum, spark vacuum, air flow rate, fuel air ratio and other information desired.

Figure 2:
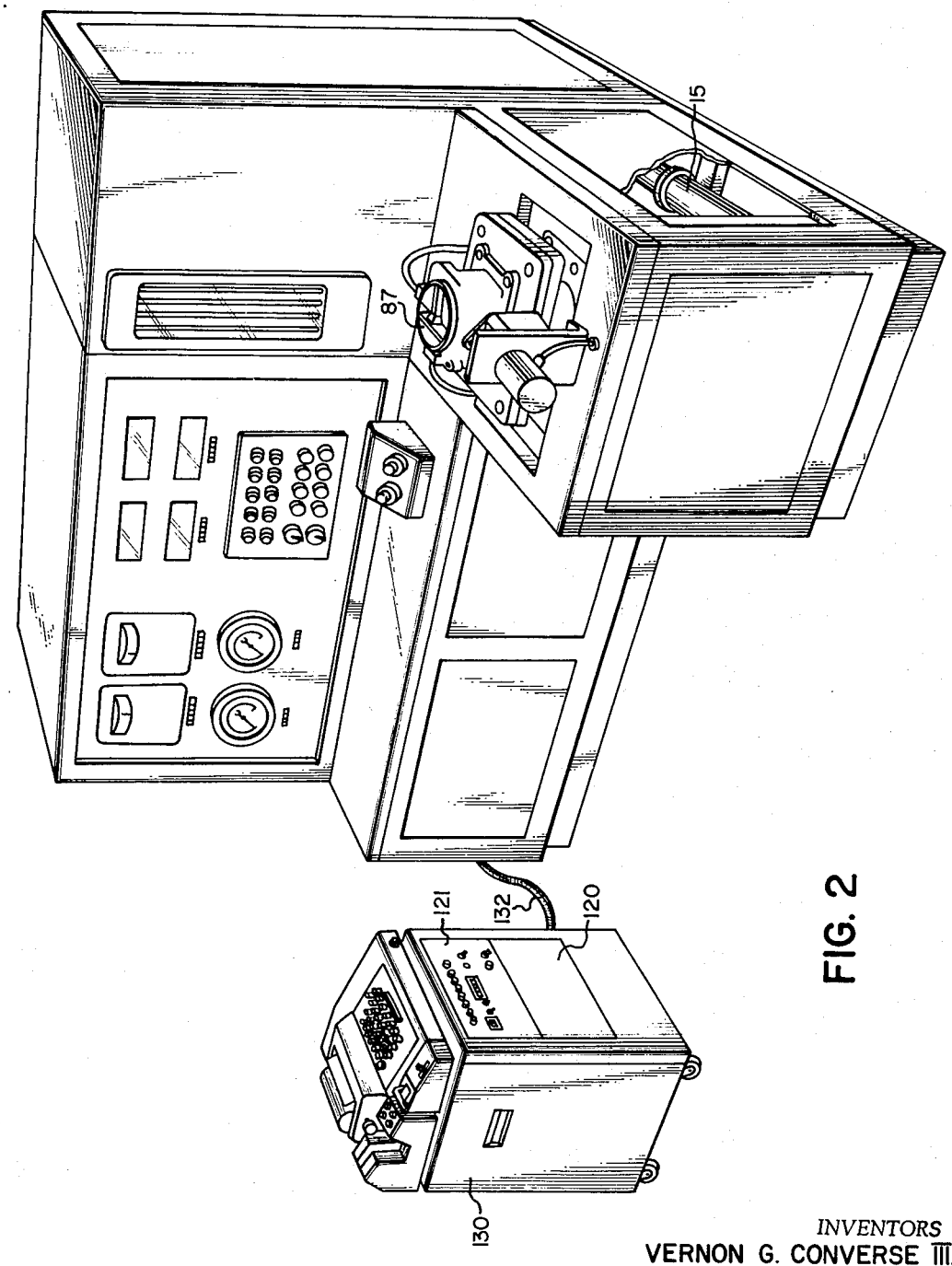
FIG. 2 is a view similar in part to FIG. 1 but showing a hoodless system for testing carburetors with a separate portable computerized controls device connected to the system with the aid of an electric cable.

The carburetor testing systems described above, particularly in FIGS. 12 and 13, when produced and assembled in their physical forms with necessary structural and secondary functional additions are shown in FIGS. 1 and 2. FIG. 1 shows a carburetor testing system with a hood 125 having a window 126 and moveable on guides 127 to be raised or lowered over a test carburetor 87 in order to control ambient operative conditions which may influence the test results. The stand wall is broken off in part to expose to view the variable area critical venturi meter body 15.

The installation of FIG. 2 is a modified construction intended for installation in a controlled room with stabilized ambient conditions which make provision of the windowed hood unnecessary. The device indicated by the numeral 130 is a portable control device including a computer 120 having a computer interface 121. It may be moved for use with various installations and be connected thereto with the aid of an electrical cable 132.

There are thus provided an improved venturi meter and a gaseous medium control system whereby the objects of the invention listed above and numerous additional advantages are attained.

We claim:

1. A variable area venturi meter adapted to be operated critically at all points of its operating range and comprising a meter body having a venturi passage with a converging section, a diverging section of approximately 12°, and a throat therebetween, a control cone having a straight line generatrix and a cone angle of approximately 3 degrees, said cone operatively mounted within said venturi passage co-axially therewith with the convergence of the cone directed against the flow of the fluid and the thin portion of the cone being located on the converging side of said venturi passage, said cone being selectively movable longitudinally of the venturi passage into and out of the throat to restrict and to enlarge the free area thereof, and consequently of the flow of fluid therethrough.

2. The device defined in claim 1, with the thinnest portion of the control cone being adapted to be substantially in the plane of the venturi throat to provide for the maximum flow of fluid, said control cone having at its thickest portion a cover-like flange adapted, when moved to the end of its closing movement, to close the end of the divergent portion of the venturi passage and thus to stop the flow of the fluid through the venturi.

3. The device defined in claim 1, the included angle of the control cone being approximately three degrees to provide a control cone having substantially greater length than that of the venturi passage to ensure travel of the control cone in its control movements and greater precision of measurements in its travel and, consequently, of the fluid flow.

4. The device defined in claim 1, and including a cylindrical inlet tube delivering the incoming fluid against the thin end of the control cone disposed co-axially of the converging portion of the venturi passage.

5. A variable area venturi meter adapted to be operated critically at all points of its operating range and comprising a meter body having a venturi passage with a converging section, a diverging section having an included angle of approximately 12°, and a throat there between, a control cone having a straight line generatrix and an included angle of approximately 3°, said cone operatively mounted within said venturi passage co-axially therewith with the convergence of the cone directed against the flow of fluid and the thin portion of the cone being located on the converging side of the venturi passage, said venturi meter maintaining a constant exit angle as said cone is moved into and out of said venturi passage.

* * * * *

UNITED STATES PATENT AND TRADEMARK OFFICE
CERTIFICATE OF CORRECTION

PATENT NO. : 3,896,670

DATED : July 29, 1975

INVENTOR(S) : Vernon G. Converse, III, Robert W. Clayton, James T. Westervelt

It is certified that error appears in the above–identified patent and that said Letters Patent are hereby corrected as shown below:

In the patent heading, in the portion of the heading starting "[*] Notice", the date "Mar. 24, 1989", should read, --- August 18, 1987 ---.

In the specification, in column 14, line 67, between the word "ensure" and the word "travel" should appear the word --- greater ---.

Signed and Sealed this twenty-third Day of December 1975

[SEAL]

Attest:

RUTH C. MASON
*Attesting Officer*

C. MARSHALL DANN
*Commissioner of Patents and Trademarks*